United States Patent [19]

Bridges et al.

[11] Patent Number: 5,252,408
[45] Date of Patent: Oct. 12, 1993

[54] VACUUM INSULATED PANEL AND METHOD OF FORMING A VACUUM INSULATED PANEL

[75] Inventors: John A. Bridges, Nashville; Philip H. Neal, Donelson; John E. Besser, Franklin, all of Tenn.

[73] Assignee: Aladdin Industries, Inc., Nashville, Tex.

[21] Appl. No.: 587,344

[22] Filed: Sep. 24, 1990

[51] Int. Cl.$^5$ .................. B32B 1/06; B32B 15/04; B32B 15/16

[52] U.S. Cl. .................. 428/621; 428/624; 428/634; 428/69; 428/76; 428/920; 52/791; 29/897.32; 29/DIG. 44

[58] Field of Search .................. 428/69, 76, 920, 624, 428/621, 634, 586; 52/791; 220/420, 421; 29/897.32, DIG. 44

[56] References Cited

U.S. PATENT DOCUMENTS

| | | | |
|---|---|---|---|
| 1,071,817 | 9/1913 | Stanley | 220/422 |
| 1,898,172 | 2/1933 | Comstock | 62/333 |
| 1,898,977 | 2/1933 | Comstock | 62/333 |
| 3,147,877 | 9/1964 | Beckman | 220/422 |
| 3,151,365 | 10/1964 | Glaser et al. | 428/69 |
| 3,179,549 | 4/1965 | Strong et al. | 220/421 |
| 3,302,358 | 2/1967 | Jackson | 52/573 |
| 3,514,006 | 5/1967 | Molnar | 220/422 |
| 3,724,703 | 4/1973 | Yamamoto | 220/9 |
| 3,828,960 | 8/1974 | Walles | 428/35.9 |
| 3,921,844 | 11/1975 | Walles | 428/35.9 |
| 3,933,811 | 11/1976 | Walles | 428/35.9 |
| 4,154,364 | 5/1979 | Hagiwara et al. | 220/422 |
| 4,251,252 | 2/1981 | Frazier | 65/34 |
| 4,444,821 | 4/1984 | Young et al. | 428/69 |
| 4,468,423 | 8/1984 | Hall | 428/72 |
| 4,486,482 | 12/1984 | Kobayashi et al. | 428/69 |
| 4,529,638 | 7/1985 | Yamamoto et al. | 428/69 |
| 4,594,279 | 6/1986 | Yoneno et al. | 428/69 |
| 4,636,415 | 1/1987 | Barito et al. | 428/68 |
| 4,646,934 | 3/1987 | McAllister | 220/420 |
| 4,664,632 | 6/1987 | Kawasaki | 428/69 |
| 4,668,551 | 5/1987 | Kawasaki et al. | 428/69 |
| 4,681,788 | 7/1987 | Barito et al. | 428/69 |
| 4,704,068 | 11/1987 | Theiben et al. | 220/420 |
| 4,726,974 | 2/1988 | Nowobilski et al. | 428/69 |
| 4,745,015 | 5/1988 | Cheng et al. | 428/35 |
| 4,794,748 | 1/1989 | Schilf | 52/393 |
| 4,798,753 | 1/1989 | Abuaf et al. | 428/69 |

OTHER PUBLICATIONS

"Refrigerator Makers Plan for Future Without CFCs", Wall Street Journal, Dec. 15, 1989.
Portions of article from Popular Science "Refrigerators Without CFCs", Jul. 1990, p. 90.
Portions of article from Appliance, Jun. 1990.
An unidentified publication dated Apr. 30, 1990.
A packet of materials obtained from the CVI Industry Review Panel meeting held at Marriot Denver West in Golden Colorado on Jun. 21, 1990.

*Primary Examiner*—John Zimmerman
*Attorney, Agent, or Firm*—Sandler, Greenblum & Bernstein

[57] ABSTRACT

A vacuum insulated panel having high thermal insulating value is described together with a method of making such a panel. The panel is formed of peripherally welded metallic wall members which define a cavity within which a solid compressed block of particulate material is disposed. The particulate material, preferably an activated carbon black, a silica gel or a combination thereof, serves as a barrier to radiant thermal transmission through the panel, acts as a getter to maintain the vacuum in the cavity, and, with proper density, supports the walls of the panel against collapse when the cavity is evacuated. In one embodiment of the invention, the vacuum insulated panel is covered on one side with a polyurethane foam insulating material.

37 Claims, 5 Drawing Sheets

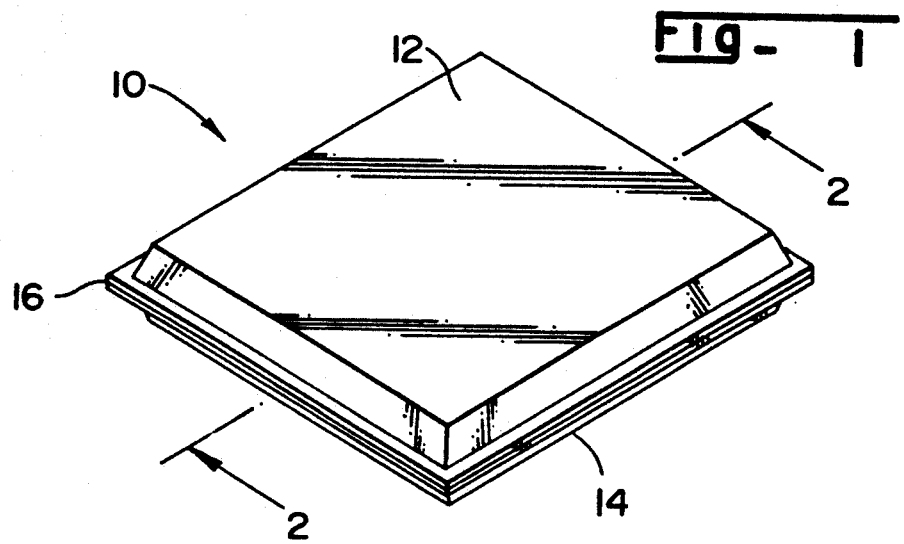
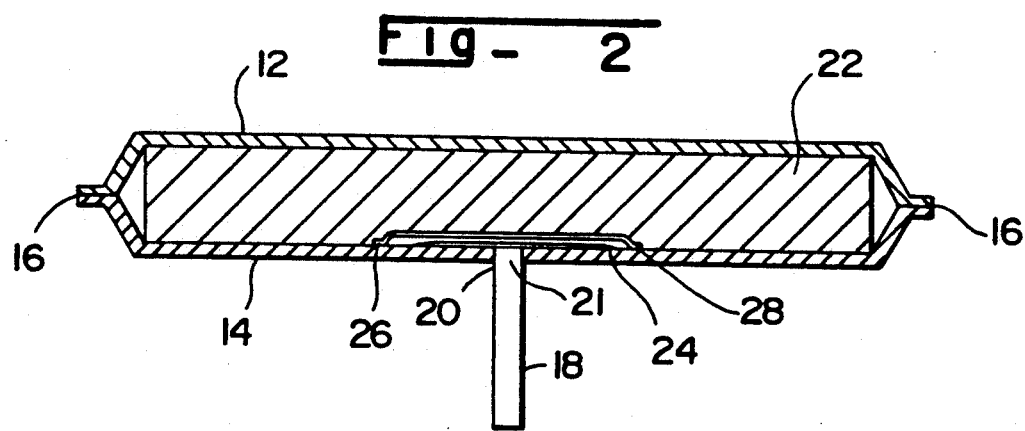
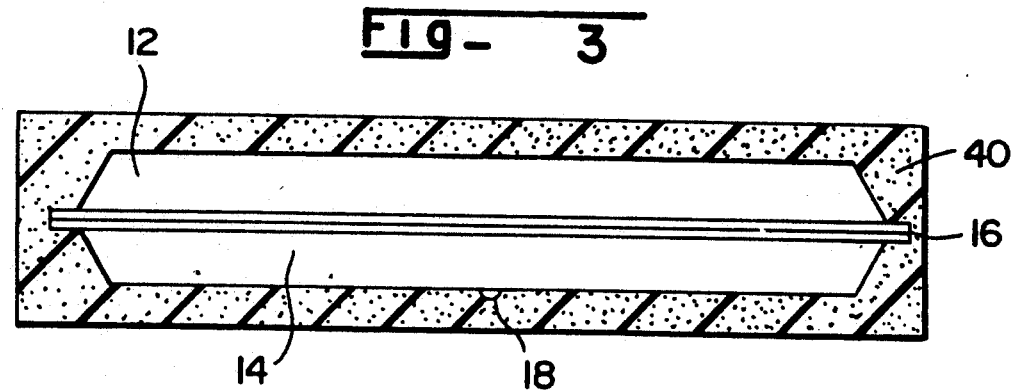

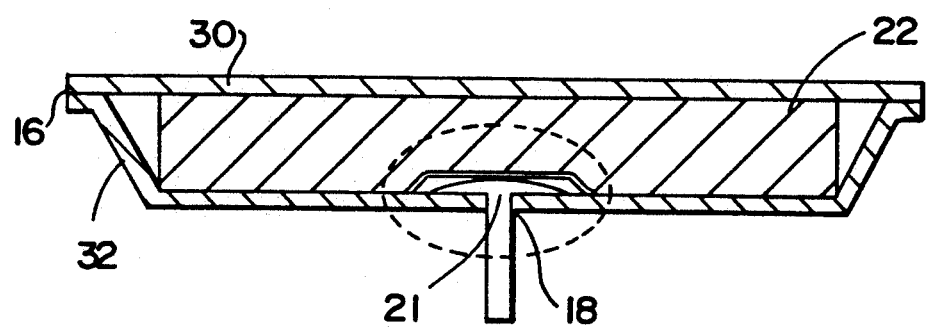
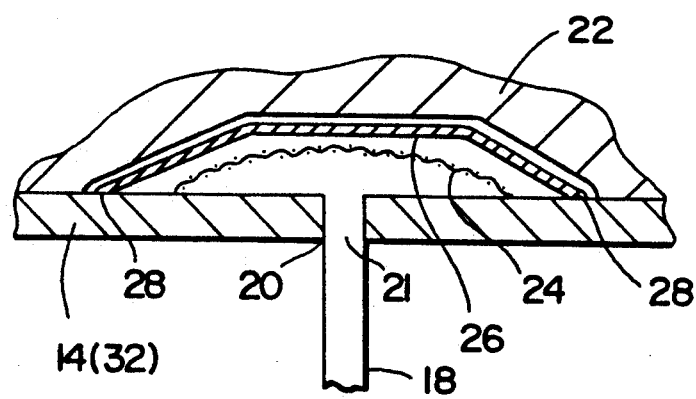
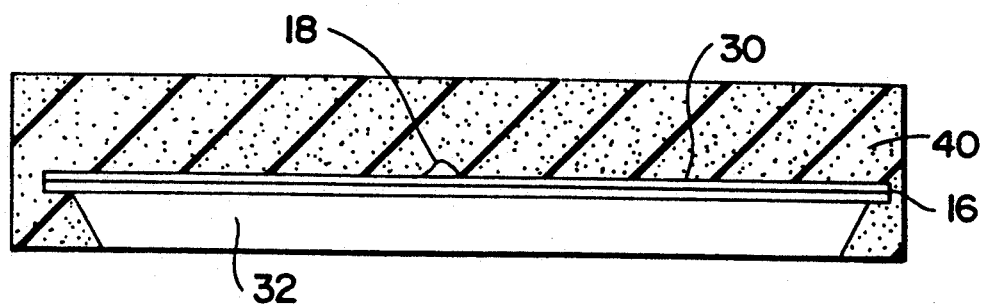

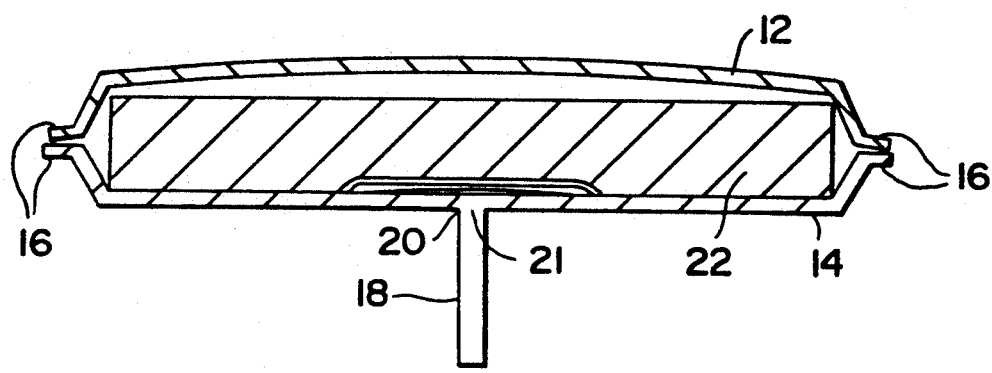
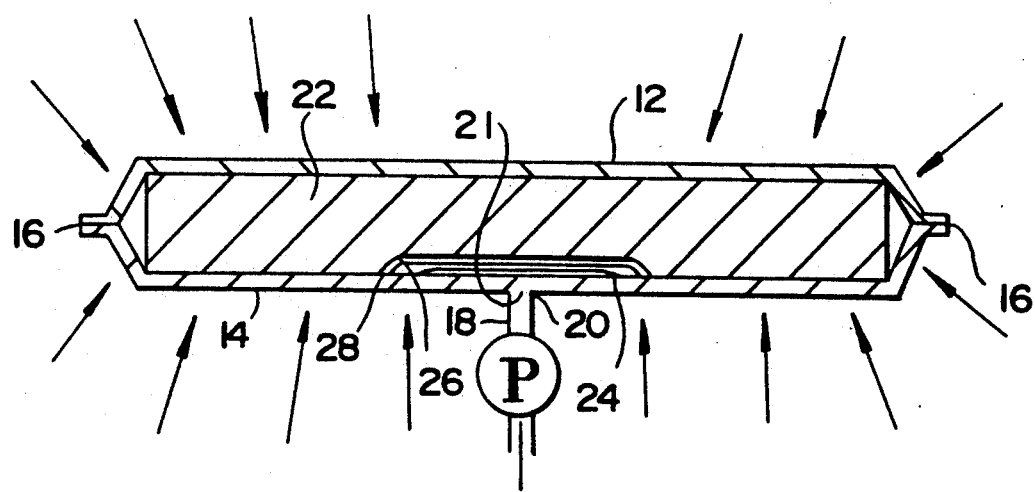

VACUUM INSULATED PANEL AND METHOD OF FORMING A VACUUM INSULATED PANEL

1. Technical Field of the Invention

The present invention relates to a vacuum insulated panel and to a method of making such a vacuum insulated panel. More particularly, the present invention is directed to a vacuum insulated panel, and to a method of forming such a panel for use as an insulation barrier to prevent transmission of heat between the sides of the panel. Such panels are particularly well suited for use, e.g., in refrigeration equipment and particularly for use in the door or walls of a refrigerator; however, the scope of potential uses is not limited to the same and a wide variety of applications are presently intended, only some of which are enumerated herein below.

The present invention also relates to a vacuum insulated panel and methods of forming such vacuum insulated panels such that the panels will retain a vacuum for extended periods of time, and particularly for fifteen or more years. Vacuum insulated panels fabricated according to the method of the invention are extremely efficient at preventing the transmission of heat, are relatively inexpensive and easy to manufacture, and are thus useable in a wide range of industrial, commercial and residential applications.

2. Discussion of Background and Material Information

Foam plastic panels are currently very widely employed as insulating panels in refrigerators, refrigerated trucks, picnic coolers and freezers. Refrigerator and freezer manufacturers have been constantly striving to increase the efficiency of their products, and in particular, have attempted over the years to produce a reliable, highly efficient and moderate cost product. In the recent past, attempts to increase efficiency in refrigerators and freezers have achieved success by employing more and better foam insulation in the wall panels of the refrigerators and freezers, by increasing the compressor efficiency and by various design changes, including the relocation of the heat generating components of the refrigerator and/or freezer.

Recently, an added emphasis has been provided to motivate manufacturers to strive for increased efficiency in their products. The Department of Energy and the Environmental Protection Agency have both recently promulgated regulations that will have a pronounced effect upon the design, manufacture and sale of refrigerators and freezers in the near future. The Department of Energy has promulgated regulations mandating substantially increased energy efficiency for home appliances, and, since refrigerators in the United States consume an estimated 7% of the electricity generated in the nation, the proposed regulations mandate a substantial improvement in refrigerator efficiency. The Environmental Protection Agency has promulgated regulations to limit the use of fluorocarbons in all applications, since there is increased concern throughout government, industry and society in general that increased use of fluorocarbons might contribute to depletion of the ozone layer and result in an increase in exposure to ultraviolet which is a significant cause of skin cancer. It is conceivable that, in the not too distance future, the use of fluorocarbons will be totally banned.

Fluorocarbons are used in the manufacture of insulating foam materials such as polyurethane and as a blowing agent that yields a foam having a high resistance to heat transmission. Fluorocarbons are also utilized in refrigerators and freezers as the working fluid (i.e. refrigerant) circulating between the compressor and the evaporator.

As a result of all of the above mentioned factors, the appliance industry is engaged in extensive research directed towards developing various alterative working fluids for compressors. Possible replacements for common Freon 12 in refrigerator and freezer compressors include Freon 122 and Freon 123. Similarly, the urethane industry is exploring a wide range of alternatives to the use of fluorocarbons for use as blowing agents in foams. However, many of the proposed alternatives to fluorocarbons result in less heat resistance, which leads to poorer insulating properties for the resulting foam. Further, some of the proposed substitute refrigerants have flammability problems. As a result of these factors, the appliance industry is highly desirous of finding solutions to the aforementioned problems that will result in increased appliance efficiency and increased appliance reliability, at moderate to low costs, and without the use of fluorocarbons.

It is well known that excellent thermal insulation capability can be obtained by providing a sealed vacuum between two members. Perhaps the most common device utilizing this principal is the ordinary thermos or vacuum flask. In STANLEY, the assignee's own expired U.S. Pat. No. 2,071,817, patented Sep. 2, 1913, such a vacuum or thermos bottle is disclosed. The STANLEY patent discloses filling of an evacuated space between the inner and outer walls of a bottle or flask with a finely divided material, such as metallic oxides, so as to enable the vacuum to achieve a desired degree of heat insulation at a much reduced gaseous pressure, i.e., with much less exhaustion. While this solution has been quite acceptable for the ordinary thermos bottle, which can be replaced or discarded upon deterioration of the vacuum, in a refrigerator or freezer having an average useful life of twenty or more years, it is essential that, if a vacuum is utilized, the vacuum must be maintained virtually indefinitely without deterioration.

As a result, a great deal of research has been undertaken to attempt to provide a long lasting, highly efficient vacuum insulated panel that could be used in refrigerator and freezer cabinets. These research efforts have led to somewhat diverse solutions to the problems involved in the construction of a long-lasting vacuum insulated panel.

In this regard, various types of vacuums must be defined and distinguished. A "rough" or "soft" vacuum is generally defined as a vacuum having a pressure in the range of 1 to 10 torr (i.e., in the millitorr range). On the other hand, a "high" or "hard" vacuum is generally defined as a vacuum having a pressure in the range of $10^{-3}$ to $10^{-6}$ torr (i.e., in the microtorr range). Thus, a soft vacuum is a vacuum that permits relatively more gases to remain within the evacuated space than in the case of a hard vacuum. Thus, while it is substantially easier (i.e., faster and thus less expensive) to obtain a soft vacuum, the thermal insulation efficiency of a hard vacuum is much higher than a soft vacuum. Accordingly research efforts are now being directed towards developing long-lasting vacuum insulating panels.

The difference in thermal conductivity of air or other gases at various pressures can be quite substantial. It is well known that thermal conductivity of air between atmospheric pressure and approximately 10 torr remains relatively constant. Then, there is a sharp drop in thermal conductivity as the pressure is decreased to about $10^{-3}$ torr. There is then little discernable further decrease below about $10^{-3}$ torr. At this level of vacuum, the heat conductivity through the evacuated volumetric space is substantially zero. However, while a hard vacuum is much more efficient as a thermal insulator, a hard vacuum is much harder and much more expensive to obtain, and to retain over the useful life of a refrigerator insulated with vacuum panels.

In addition to the above noted difficulties in forming a hard vacuum insulating panel, other factors are involved in the manufacture and construction of such a vacuum insulating panel. A significant problem exists in that, when evacuating a space to such a low pressure, the walls defining the evacuated space tend to collapse towards each other. This, of course, is highly undesirable, from both a structural as well as from a heat conductive vantage, since, to have a good insulating member, one should avoid direct metal-to-metal contact, and the resulting heat transfer paths that are formed. The most direct previous solution to the problem of panel collapse upon evacuation has been to increase the structural rigidity of the wall members making up the panel. This, however has resulted in greater direct conduction of heat through the metal of the wall and members to a decreased insulative value for the vacuum insulated panel as a whole.

As a result, some efforts towards developing vacuum insulated panels have attempted to utilize plastic members to form and/or to support and/or to line the wall elements, because plastic has a generally lower thermal conductivity than metal. However, this has resulted in substantial problems in maintaining the vacuum at a desired, insulative effective level over extended periods of time. These problems are caused by the tendency of the plastic materials to slowly release dissolved gases (i.e., outgassing), and by the general permeability of the plastic polymers to the gases of the atmosphere, such as oxygen, nitrogen, carbon dioxide, argon, etc. In order to eliminate these substantial drawbacks to the use of low conductivity plastic materials as all or part of the wall members in the thermal insulated panels, many proposals have been made to either seal the plastic panel or to metallize the surfaces thereof. These solutions have not been entirely successful and have substantially increased the complexities of manufacturing the panel, and to higher manufacturing costs.

In using metal members for the vacuum panel wall members, attempts have been made to use relatively thin members and to provide spacers, reinforcing elements, or supports within the evacuated chamber. The problem with these approaches has been that the supports generally result in areas of increased thermal conductivity through the vacuum, thus resulting in a substantial deterioration of the insulating capacity of the panel as a whole by providing thermal shorts, (i.e., paths of relatively high conductivity) through the panel. Moreover, in forming these internal reinforcing members, substantial problems in the fabrication and uniform spacing of such members have been encountered. As internal reinforcing members, offset dimples, corrugated support panels and sheets containing glass beads, ribs, or rods have been proposed. Each of these methods, however, has required precise alignment of the internal reinforcing members, and has resulted in substantial additional complexities in the fabrication of the vacuum insulated panel as well as in providing additional paths for the conductance of heat through the panel itself. These additional conductive paths, which have been referred to as thermal shorts, result in a nonuniform heat distribution and lead to substantial deterioration of the heat insulation capacity of the vacuum insulated panel.

On the other hand, the vacuum insulated panel of the present invention, and the method of forming a vacuum insulated panel according to the present invention, overcome all of the above mentioned problems and result in a vacuum insulated panel of extremely high efficiency in terms of its impedance to transfer heat, in terms of the long term viability of the vacuum, and in terms of the manufacturing simplicity, and hence, result in moderate manufacturing cost.

SUMMARY OF THE INVENTION

The present invention, therefore, is directed to a vacuum insulated panel and to a method of producing such a vacuum insulated panel for use in various environments, and particularly in the cabinet walls of refrigerators and freezers. In this regard, the present invention is directed to a vacuum insulated panel that does not require internal reinforcing members or spacers, but which provides a getter material within the vacuum insulated panel to absorb any gases that may be produced by outgassing from the material of the wall panels thereof. Further, a substantial additional increase in insulation efficiency may be achieved by surrounding at least one side of the vacuum panel of the present invention within a foamed insulating material.

Thus, in accordance with the present invention, a vacuum insulated panel is disclosed which includes first and second peripherally joined wall members that define a cavity. A getter material is positioned within the cavity and means for evacuating the cavity and for establishing a vacuum within the cavity are provided. Members are also provided for preventing the getter material from being evacuated during the evacuation of the cavity. Further, the present invention provides for sealing of the cavity after the vacuum has been established within the cavity. The getter material utilized in the present invention comprises a compressed cake of particulate material which is positioned within the cavity and which is sized so as to substantially fill the cavity. The compressed cake of particulate material is the sole support, within the cavity, for the walled members defining the cavity and is effective to prevent collapse of the cavity during the evacuation of the cavity. According to a further feature of the present invention, the getter material comprises a compressed cake of activated carbon black or silica gel, or mixture of both.

According to a feature of the present invention, the evacuation of the cavity includes establishing a hard vacuum within the cavity. One of the walled members defining the cavity includes an evacuation port and a gas permeable member that is impermeable to the getter material is positioned adjacent to the evacuation port to prevent the getter material from being evacuated during the establishment of the vacuum within the cavity. The wall members defining the cavity includes metal surfaces and the surfaces of the wall members are in metal-to-metal contact with each other only at the peripheral portions of the wall members. According to a further feature of the present invention, an expanded foam insulating material can be provided to encase or cover at least one side of the evacuated panel. The impervious member that prevents the evacuation of the getter material during evacuation of the cavity includes a mesh screen layer and a thin fiberglass paper layer peripherally sealed about the evacuation port that is provided in one of the wall members defining the cavity.

The vacuum insulated panel according to the present invention further includes first and second peripherally joined metal panels defining a cavity with a getter material positioned within the cavity. A mechanism is provided for establishing a vacuum within the cavity, and the getter material prevents the metal panels from coming into contact with each other, at least during the establishment of the vacuum within the cavity. The cavity is sealed after the vacuum is established within the cavity.

According to a feature of the present invention, the metal panels defining the cavity include joined peripheral portions and permit metal-to-metal contact only at the peripheral portions of the metal panels. The getter material utilized in the present invention comprises a compressed cake of a particulate getter material, which compressed cake is sized so as to substantially fill the cavity defined by the metal panels. The mechanism for establishing a vacuum within the cavity according to the present invention includes establishing a hard vacuum within the cavity and a mechanism is further provided for preventing the getter from being evacuated during the establishment of the hard vacuum within the cavity. According to a further feature of the invention, a foam insulating material can be provided to encase or cover at least one side of the evacuated cavity defined by the metal panel members.

The present invention also includes a method of making a vacuum insulated panel, including the steps of providing first and second peripherally joined members which define a cavity and introducing a compressed block of particulate material into the cavity. The method further includes completely sealing the peripheral edges of the first and second members, evacuating the defined cavity through an aperture, preventing the evacuation of the compressed particulate material through the aperture while the cavity is being evacuated, and sealing the aperture to maintain the vacuum within the cavity.

According to a further feature of the method of making the vacuum insulated panel of the present invention, the introduction of a compressed block of particulate material includes the introduction of a compressed block of activated carbon black and/or silica gel into the cavity. Further, the step of preventing the evacuation of the compressed particulate material from the cavity includes positioning a gas porous, particulate material impervious member adjacent to the aperture. By introducing a compressed block of particulate material, the present invention prevents the peripherally joined members defining the cavity from coming into contact with each other during the evacuation of the cavity. The compressed block of particulate material also provides a radiant heat transfer barrier within the cavity and acts as a getter material within the cavity.

According to a further feature of the method of the present invention, the step of introducing the compressed block of particulate material into the cavity includes substantially filling the cavity with the compressed block of particulate material. The present method further includes the step of covering or encasing at least one side of the panel with a block of insulating material. Further, the step of evacuating the cavity through an aperture includes establishing a hard vacuum within the defined cavity. The present invention further includes a vacuum insulated panel made according to the aforementioned method.

The present invention further relates to a vacuum insulated article of manufacture which includes first and second generally planar, edge-joined panels which define an evacuated vacuum cavity having a block of compressed particulate material positioned within the cavity. The block of particulate material acts to prevent collapse of the cavity during evacuation, acts as a radiant thermal energy barrier and acts as a getter within the cavity. The panels utilized in the article of manufacture according to the present invention include metal members which have peripheral edge portions. The panels contact each other only at the peripheral edge portions by metal-to-metal contact with each other. The article of manufacture according to the present invention further includes the provision of an element positioned within the cavity to prevent the evacuation of the particulate material during evacuation of the cavity. According to a further feature of the invention, the material within the cavity comprises activated carbon black or silica gel or a mixture of both and at least one side of the panel is encased within a block of insulating material after evacuation. This, of course, can be accomplished as a secondary operation such as "foaming in" the cabinet of a refrigerator.

According to a further feature of the invention, the present invention is drawn to a vacuum insulated panel including structure defining a cavity and enabling the establishment of a vacuum within the cavity. Provided within the cavity are components acting as a getter and for permitting the establishment of a vacuum within the cavity while at the same time preventing evacuation of the getter from the cavity. The panel also includes a mechanism for maintaining the vacuum within the cavity. According to a further feature of the invention, the cavity is defined by a pair of generally planar, peripherally sealed, panel members and the getter material also includes a mechanism for preventing the panel members from coming into contact with each other during the establishment of the vacuum within the cavity. The getter material comprises a cake of compressed particulate material, which, in a preferred form of the invention, can comprise activated carbon black or silica gel, or mixtures thereof.

According to a further feature of the invention, the component within the cavity that permits the establishment of a vacuum therein, while preventing the evacuation of the getter therefrom, includes a gas permeable member that is impervious to the getter material and that is positioned adjacent to a sealable evacuation port provided in the cavity defining structure. A yet further feature of the vacuum insulated panel according to the present invention includes covering or encapsulating at least one side of the evacuated panel within a block of foam insulating material.

The present invention also relates to a method of forming a vacuum insulated panel. The inventive method comprises providing a peripherally sealable cavity and positioning a solid particulate getter material, of a sufficient density, within the cavity, so as to prevent collapse of the cavity upon evacuation of the cavity to a hard vacuum. The cavity is further provided with an evacuation port, and a gas permeable, getter impermeable, filter member is positioned adjacent to the evacuation port of the cavity. After peripherally sealing the cavity, the cavity is evacuated to a hard vacuum and the port is sealed to maintain the hard vacuum within the cavity.

According to a further feature of the method of the present invention, the method includes the step of encasing or covering at least one side of the sealed evacuated cavity within a block of foam insulating material. The solid particulate getter material that is positioned within the cavity of the present invention is a compressed block of activated carbon black or silica gel, or combination of both that is sized so as to substantially fill the cavity with solid getter material. The gas permeable, getter impermeable, filter member that is positioned adjacent the aperture of the cavity includes a mesh screen member and a thin fiberglass paper layer secured to the inside of the cavity. The present invention also relates to an insulated panel formed according to the steps of the aforementioned method.

The present invention is further embodied in a method of forming a vacuum insulated panel including the steps of positioning a getter material within an evacuatable cavity, providing a gas permeable, getter impermeable material between the getter material and an evacuation port in one of the walls of the cavity, evacuating the cavity through the evacuation port to a hard vacuum and then sealing the evacuation port. The invention further contemplates covering or encasing at least one side of the evacuated cavity within a foamed insulating material. Positioning of the getter material includes preventing the collapse of the cavity upon evacuation to a hard vacuum; and the getter material itself is comprised of a compressed block of particulate getter material.

According to a further feature of the method of the present invention, the cavity is defined by a plurality of peripherally joined planar metal members. A further feature of the present invention relates to a vacuum insulated panel formed according to the method described.

BRIEF DESCRIPTION OF THE DRAWINGS

The invention is further described in the detailed description which follows, with reference to the drawings, by way of non-limiting examples of the preferred embodiments of the present invention, in which like reference numerals represent similar parts throughout the several views, and wherein:

FIG. 1 is a perspective view of the exterior of the vacuum insulated panel of a preferred embodiment of the present invention;

FIG. 2 is a cross-sectional view of the vacuum insulated panel of a preferred embodiment of the present invention, taken along line 2—2 of FIG. 1;

FIG. 3 is a partially cross-sectional view of the thermal insulated panel of another preferred embodiment of the present invention, wherein a vacuum panel is encased within a block of polyurethane type foam insulating material;

FIG. 4 is a cross-sectional view of the vacuum insulated panel according to yet another embodiment of the present invention, showing the panel cavity formed of one flat and one dish-shaped member;

FIG. 5 is a cross-sectional close-up view of a portion of the vacuum insulated panel of the invention showing the area adjacent to the evacuation port in greater detail;

FIG. 6 is a cross-sectional view of the vacuum insulated panel according to yet another embodiment of the present invention, showing the panel cavity formed of one flat and one dish-shaped member and wherein the flat side of the panel is covered by or encased in a layer of insulating foam.

FIG. 10 is a cross-sectional view of the panel of FIG. 1, before a vacuum is created within said panel, but showing the edges of opposed panels positioned prior to being welded to each other, and before a vacuum has been created therein; and FIG. 11 is a cross-sectional view of the panel of FIG. 10, after a hard vacuum has been created within the panel, with the particulate material block supporting opposite walls of the evacuated panel.

DETAILED DESCRIPTION OF THE INVENTION

Figure 7:
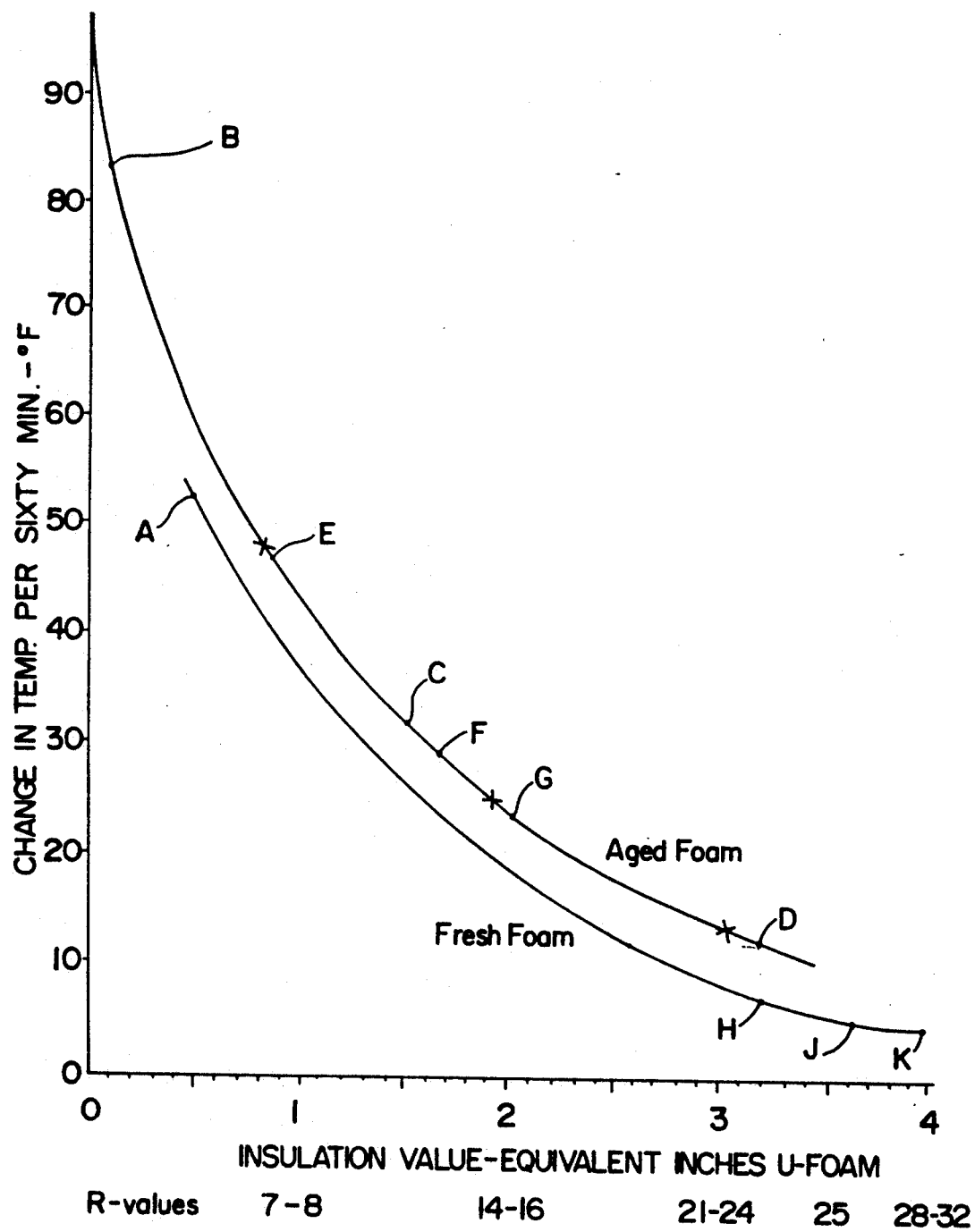
FIG. 7 is a graph showing the insulative effect of various vacuum insulated panels fabricated according to the teachings of the present invention.

In general, the present invention is directed to a vacuum insulated panel and method of making the same. While the vacuum insulated panel of the present invention is particularly directed toward utility in the refrigerator-freezer industry, additional uses therefor are anticipated in ice chests, refrigerated trucks, in roof and building insulation, as well as in any other industrial, commercial or residential environment, wherein highly efficient, long-term thermal insulation is desired. Uses with similar requirements are also clearly within the scope of the present invention.

With particular reference to FIGS. 1 and 2, one embodiment of a vacuum insulated panel according to the present invention is illustrated. The vacuum insulated panel 10 is formed of two wall or panel members 12, 14, comprising relatively thin, metal sheets, such as stainless steel, that are shaped into the illustrated shallow dish-like configuration using a single stage die or any other conventional forming technique. These wall members 12, 14 have a peripherally extending edge 16 at which the two wall members are welded to each to form an air tight cavity. However, prior to the welding of the edge or seams 16, an exhaust or evacuation tube 18 must be attached to the external surface of one of the panels 12, 14, at an aperture 21 on one of the panels.

The tube 18, which can be attached at any desired location 20 on either one of the panels, can be attached and secured thereto in any conventional manner. The exhaust tube 18 may be a screw-type nipple such as is used for a Stanley thermos bottle or a copper tube type that can be welded or brazed, in an air-tight fashion, onto one of the wall members 12, 14 so as to surround an aperture provided in the wall member. Referring to the enlarged view of FIG. 5, directly over the aperture 21, and on the inside of the wall member having the exhaust tube 18 on the outside thereof, a mesh screen 24 is provided, and a thin sheet of fiberglass paper 26 is adhered onto the inner surface of the panel member to surround and completely seal the mesh screen 24 and the area, within which it is positioned adjacent to the exhaust port 18. With reference to the illustration of these components in FIG. 5, it is noted that the height dimensions of the screen 24 and paper 26, as well as the spacing therebetween are grossly exaggerated to facilitate illustration. Moreover, no depression is formed in the block 22 to accommodate these components. Rather, the unexaggerated height of these components is accommodated by the natural resilience of the compressed block 22.

An adhesive 28, for securing the edges of the fiberglass paper 26 onto the inner surface of the panel 14, may comprise a sodium silicate solution because it does not outgas. Outgassing refers to the spontaneous evolution of gas from a material in a vacuum and, as noted above, use of a sodium silicate solution as the adhesive 28 eliminates/minimizes the problem of adhesive outgassing in the vacuum insulated panel. Obviously, outgassing results in deterioration of the vacuum and is to thus be avoided, to as great a degree as possible. Sodium silicate is also selected because it can be baked without deterioration at high temperatures.

The fiberglass paper and wire mesh screen together act as a filter to prevent any of the particulate block 22 (described below) from being evacuated through the exhaust port during the establishment of a hard (or other) vacuum within the cavity defined by the panel members 12, 14, while at the same time permitting the air and any other gases to be exhausted therefrom.

Figure 8:
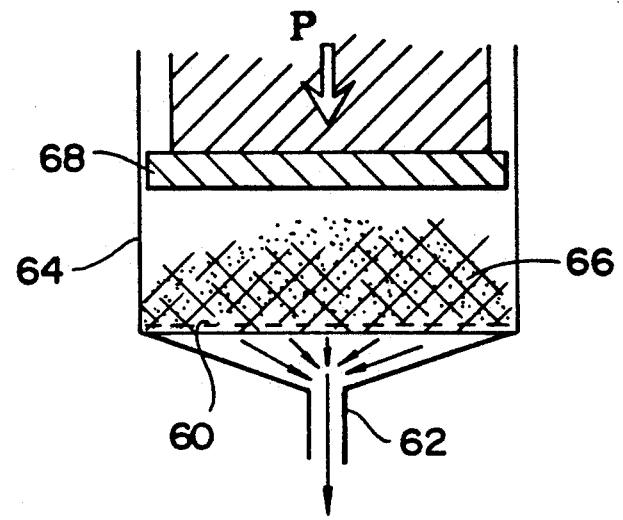
FIG. 8 is a cross-sectional view, in schematic of one form device that can be used to shape and compress a block of particulate material.

The block 22 illustrated in FIG. 2 represents a compressed block of particulate material which performs a plurality of essential functions in enhancing the heat insulating properties of the vacuum insulated panel of the present invention. According to a preferred embodiment of the present invention, the block can be formed, e.g., of particulate charcoal, activated carbon black, silica gel, or an appropriate mixture thereof. The block is formed, e.g., by compressing the silica gel or carbon black to form a solid block of a desired shape and size. The block is manufactured by placing a sheet of fiberglass paper 60 over a vacuum port 62 provided in the bottom of a form 64, as shown in FIG. 8. The form, which is generally rectangular (although any desired shape can be utilized, consistent with the selected panel shape), has dimensions which are very slightly less than the inner dimensions of one of the panel wall members 12, 14. After the proper amount of particulate silica gel, charcoal (or carbon black) 66 is placed within the form over the vacuum, the vacuum is turned on. While the application of a vacuum helps to compress the particulate charcoal material, a piston type compressor arrangement 68 is provided to apply downward pressure P, on top of the particulate material 66 to tamp it down firmly until it forms a solid cake of the desired density. The packing density utilized according to a preferred feature of the present invention for a charcoal or carbon black particulate material is in the range of 16 to 25 pounds per cubic foot.

Figure 9:
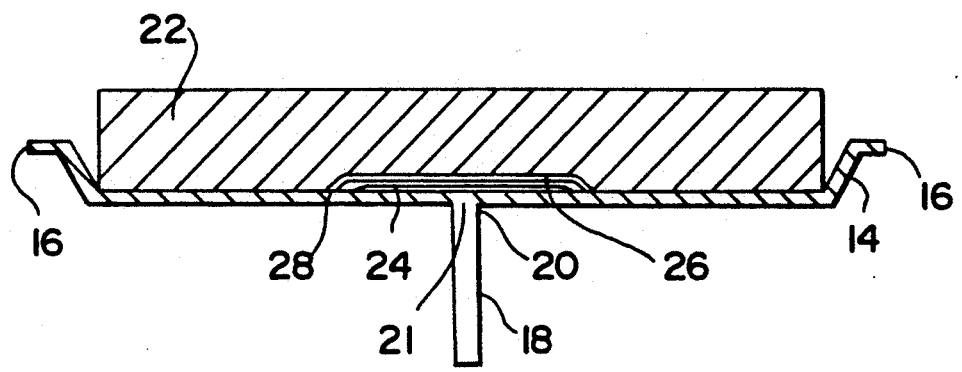
FIG. 9 is a cross-sectional view of the base of the panel of FIG. 1, with a compressed block of particulate material positioned therein in an initial step of forming the FIG. 1 panel.

The charcoal, silica gel, or activated carbon black that is compressed into a cake form and is then inserted into the cavity formed by the panel members 12, 14 performs a plurality of functions in the present vacuum insulated panel. The compressed block of particulate matter, as positioned in the base of the panel, is best illustrated in FIG. 9 before the top panel member is positioned thereover.

The functions performed by the block in the evacuated panel member fall into three broad categories. First, the compressed block of particulate matter acts as a getter. The function of a getter is to absorb any gases that are generated outgassing from the walls of the vacuum panel after it has been evacuated. A second and extremely important function of the compressed block 22 of particulate material positioned within the cavity defined by the panels 12, 14, is to support the panels that form the wall members of the cavity against collapse during the evacuation of the cavity. As mentioned above, a significant shortcoming of known vacuum insulated panels has been the failure to provide satisfactory interior supports to the wall surfaces forming the evacuated cavity in order to prevent the collapse of the cavity upon application of a hard vacuum, which, when used, significantly enhances the energy efficiency of the panel. In the present invention, no such interior support or reinforcing members are necessary because the compressed block of particulate matter is of sufficient density to support the walls in their spaced configuration, as is clearly shown in FIG. 11. In fact, the block of particulate material serves as the only support for spacing the flat main panel portions from each other, during and after application of a desired vacuum. Accordingly, this enables thinner (i.e., more easily deformable) metal sheets to be used for forming the wall panels herein, saving material and thus reducing production costs.

A third significant function of the compressed block of particulate material 22 is to act as a radiant barrier to heat transmission through the cavity, via radiation. While the block of particulate material utilized within the evacuated cavity is compressed, it nevertheless is of a particulate composition, and thus contains a large number extremely small voids which substantially diminish the amount of heat transmission by radiation occurring within the evacuated cavity. Moreover, the compressed cake enhances uniform heat distribution throughout the panel, and thus minimizes/eliminates local hot spots that can adversely affect the insulation properties of the panel.

In this regard, charcoal or activated carbon black, according to a preferred embodiment of the present invention, when used as the solid particulate material of the present invention, is utilized in a particle size having range of 0.4 to 1.0 microns. Similarly, when silica gel is used as the solid particulate material of the present invention, a preferred particle size is in the range of 1.0 through 10.0 microns. In forming a solid block of silica gel, the particles of silica gel, according to the preferred embodiment of the present invention, would be compressed via a mechanism such as is schematically illustrated in FIG. 8, to a density lying within the range of 6 to 12 pounds per cubic foot. This is in contrast to the preferred density range of charcoal or activated carbon black which, as set forth above, lies in a preferred range of 16 to 25 pounds per cubic foot.

As noted above, the compressed block of particulate material has very significant functions in the present invention. Thus, it acts as a support for the panel walls, it acts as a radiant barrier, and it acts as a getter to keep the vacuum clean over extended periods of time. With regard to these three functions, activated carbon black, or charcoal, is noted to be a substantially better conductor (i.e., worse insulator) than silica gel. On the other hand, silica gel is not as efficient a getter material as the activated carbon black, which, as noted above, is a much better insulator. Accordingly, an optimum composition of a material for forming the particulate block 22 can be obtained by using a combination of silica gel and charcoal to achieve a particulate block having effective getter properties, and good insulative properties. Obviously, when using a particulate block formed of a mixture of silica gel and activated carbon black, the density to which the block would be compressed would lie somewhere within the ranges set forth above for the carbon black and for the silica gel, depending on the proportions of the various components in the particulate material mixture.

After the particulate material is compressed into cake form as discussed above, the cake is positioned between the panel members by first placing it into the shallow, depression provided in base panel 14, as shown in FIG. 9. As noted above, the dimensions of the block 22 are selected so that it substantially fills the cavity formed within the panels 12, 14. In this regard, the areas shown to exist between the lateral edges of the block 22 and the panel edges (note particularly FIGS. 2 and 4) have been substantially exaggerated. In placing the cake 22 with the panels, great care must be taken to ensure that no loose particulate material finds its way onto the overlying peripheral areas 16 of the panel members 12, 14 where a weld is to be formed. The presence of such particulate charcoal or silica gel material in the area of the weld will prevent the areas from being properly welded and thus will prevent the resulting cavity from being air tight and evacuatable. After the two panel members 12, 14 are oriented with their peripheral portions in contact with each, as shown in FIG. 10, the peripheral portions are clamped and welded. In this regard, any conventional welding techniques suitable for thin sheets, such as resistance welding, electron beam welding, or the like can be employed. The welded seams produced are thereby very durable in the high temperature environment that will be encountered during the subsequent baking process.

After all four peripheral edges of the panel (which are, e.g. substantially continuous) are welded, an air tight chamber or cavity is formed, the interior of which is to be evacuated. The panel is then baked at about 650° F. to 750° F. for a period in the range of two hours after the peripheral edges of the panel have been welded. While the panel is still hot, and as shown in FIG. 11, the panel, via aperture 21, it is immediately placed under a vacuum by means of any conventional vacuum pump connected to the exhaust tube 18, and is evacuated to a hard vacuum (i.e., to at least $10^{-3}$ torr) After evacuation is completed, the exhaust port is sealed by either pinching, plugging, or crimping, as is conventional in forming vacuum chambers It is critical that during such evacuation the cake resists the compressive forces on the panels, tending to collapse them towards each other, a function that is performed by compressed block 22. Basically, only the block resists the compressive forces exerted on the main panel walls.

While in the form of the invention illustrated in FIGS. 1 and 2, the wall panel members 12, 14 are illustrated such that each of them is of a substantially identical, shallow dished configuration, this is not an essential feature of the present invention. The present invention can also be embodied in a vacuum insulated panel wherein the wall members defining the cavity to be evacuated are as shown in FIG. 4. As shown therein, the panel members 30 and 32 are of different shapes. In particular, the member 30 is a flat plate while the member 32 is of a dished configuration. While, as illustrated in FIG. 4, the exhaust tube 18 is secured to the dished panel member 32, it is expressly within the scope of the present invention to locate the exhaust tube in the flat member 30, when the panel is formed or one flat and one dished member. If desired, the flat plate 30 can be formed of a mild, cold-rolled (e.g., carbon) steel which is less expensive than the stainless steel that is used for the dish-shaped panel member 32 and for each of the substantially identically dished-shaped wall panel members 12 and 14 as shown in FIGS. 1 and 2 (stainless steel being used in view of the thinness of the panel member walls).

The thickness of the panel members which form the skin of the chamber or cavity which forms a significant feature of the vacuum insulated panel of the present invention, can be, according to a preferred embodiment, selected to be within the range of 0.004–0.013 inch. The use of this preferred thickness range for the panel wall members results in a very light, very thin and thus relatively inexpensive yet highly efficient vacuum insulated panel. The efficiency of the panel as an insulator is enhanced by the use of thinner panel members since this minimizes conductive heat transfer through the panel.

Although the vacuum insulated panels as described above are highly suitable for use in refrigerator cabinets and doors and are substantially more efficient from a thermal insulation point of view than an equivalent thickness of blown polyurethane foam, these vacuum insulated panels can nevertheless be made even much more efficient by the addition of a relatively small thickness of the same or a similar foam.

Thus, a further embodiment of the present invention is shown in FIG. 3. The vacuum insulated panel 10, substantially as depicted in and as described with respect to FIGS. 1 and 2, has a compressed block of particulate charcoal, silica gel or activated carbon black (or a combination thereof) disposed therein, and the entire panel has been welded, evacuated and sealed. Thereafter, at least one side of the stainless and/or carbon steel walled vacuum panel is encased within a block 40 of polyurethane or a similar foam. The use of a composite panel consisting of a metal walled vacuum insulated panel 10, wherein at least one side is encased within relatively thin layers of polyurethane foam 40 results in a significantly greater resistance to the transmission of heat than the simple sum of the resistances of such a vacuum insulated panel alone and the equivalent amount of foam alone. The use of such a composite vacuum-panel/polyurethane-foam sandwich results in a synergistic effect with respect to the thermal insulating properties of the composite panel. This synergistic effect is believed to result from the combination of foam and vacuum panel, i.e., the use of two adjacent, yet different insulating materials, and from the absorption and reradiation of the heat within the particulate block contained within the evacuated cavity, which acts to substantially slow the flow of heat through the panel.

In this regard, it is noted that mild cold-rolled steel is substantially less expensive than stainless steel. On the other hand, stainless steel has the substantial advantage of being significantly more resistant to rust than cold-rolled steel. However, it has been discovered that by encasing the evacuated vacuum insulated panel within a block of polyurethane foam, the foam also acts as a rust inhibitor for the panel. The use of a composite or sandwich panel thus enhances the possible use of a less expensive cold-rolled steel instead of the more expensive stainless steel to fabricate at least one of the panel members.

FIG. 6 illustrates a further embodiment of the present invention. Therein, the vacuum insulated panel is constructed of one flat and one dish-shaped member, 30 and 32 respectively. Further the nipple 18 is positioned on the flat member and the foam 40 is applied about the vacuum insulated panel such that the entire flat member 30 is encased within or covered by the foam. However, a portion of the dish-shaped member is not covered by the foam.

The exemplary embodiment of the invention as disclosed above can be installed within, for example, the door of a refrigerator by securing the flat surface of the dish-shaped member of the panel to the inside of the shell of the door (e.g. by the use of a suitable adhesive) and then applying the foam 40 thereabout to cover the nipple 18 and to fill the remainder of the door shell cavity to achieve a composite structure similar to that shown in FIG. 6.

The above-mentioned synergistic effect of the composite sandwich comprising a vacuum insulated panel encased within dual layers of polyurethane foam was dramatically illustrated during testing which involved placing the composite panel within an, e.g., foam fixture (i.e., which was insulated or isolated from the environment) and placing a container of water at 170° F. to 200° F. in contact with one surface of the foam sandwich. Thermo-couples were used to measure the increase in temperature, per unit of time, of the opposite side of various constructions of composite stainless steel vacuum panel and polyurethane foam layers, plain evacuated panels and ordinary foam slabs. The results of the actual tests, which measure heat flow through the composite panel, are shown in FIG. 7.

With reference to FIG. 7, the ordinate of the graph shows, in degrees Fahrenheit, the change in temperature at the side of the panel opposite from where the hot water was positioned after an interval of sixty minutes. The abscissa of the graph is calibrated in terms of inches of polyurethane foam and represents the equivalent insulating value, in inches of foam, for various constructions of insulating panels. The equivalent R-values are also shown along the abscissa.

As can clearly be seen from the graph, curves A and B were obtained by testing ordinary polyurethane foam panels (aged and fresh, respectively) without any vacuum insulated stainless steel envelope therein, and represent reference lines for the subsequent tests to be performed of the vacuum insulated panels fabricated according to a further feature of the present invention, as well as of composite vacuum insulated panels, fabricated according to a further feature of the invention, wherein one side of the panel is encased in a polyurethane foam sandwich.

Plots A and B are labeled in FIG. 7 to show the insulating value of both fresh foam and aged foam. In this regard, it is noted that fresh foam has a somewhat better insulating value than aged foam. This results from the fact that the freon utilized in the manufacture of the foam is retained in the pores of the fresh foam, and thus lowers the heat conductivity thereof. However, with the passage of time, this retained freon escapes from the pores of the foam and is replaced with other gases having a lower resistance to heat transfer than freon. Accordingly, aged foam has a somewhat lower insulating value than fresh foam. Thus, a one inch aged foam layer will result in a temperature change of 44° (per 60 minutes), while a two inch layer of aged foam will result in a temperature drop of 24° in the same time period. Similarly, a three inch layer of foam will result in a 14° temperature drop over sixty minutes as shown by the X's on curve B in FIG. 7.

Testing a stainless steel vacuum insulated panel, one half inch in thickness and without a foam layer thereabout, as shown in FIG. 2, shows that it has the equivalent insulation value of 1.4 inches of foam (point C). By adding a mere 0.75 inch of foam on one side of this vacuum insulated panel, an insulating value equivalent to about 3.25 inches of foam is obtained (point D). This is substantially higher than the insulation value that one would expect to achieve by adding the insulation values of the stainless steel vacuum insulated panel (1.4 inch equivalent of foam) and the foam itself (0.75 inch). Thus, by combining the vacuum insulated panel with a mere 0.75 inch of foam, an unexpected synergistic effect, equivalent to an extra 1.1 inches of foam, is obtained. This very significant and dramatic increase in insulative value results from the combination of the vacuum insulated panel of the invention with a further feature of the invention, i.e., the encasing at least one side of the vacuum insulated panel within a layer of polyurethane foam insulating material.

Although the exact mechanical or physical basis for this synergistic effect is not clearly known, it appears that by repeatedly changing the heat transfer mode through the insulative materials making up the composite panel, this effect is enhanced. In other words, when the heat is caused to pass through different types of insulative materials by various heat transmission modes, the composite insulation effect is substantially greater than what one would expect by simply adding together the thermal resistances of each of the individual insulative materials.

With further reference to the graph shown in FIG. 7, reference point E shows the insulative effect of a one-half inch thick panel having a metal skin 0.015 inch in thickness. This has an insulative effects substantially equal to one inch of polyurethane foam. Point F shows the insulative effect of a one inch thick panel having skins (i.e., wall members) formed of 0.015 inch thick steel. Similarly, reference point G shows the insulative effect of a generally similar one inch thick panel having skins formed of steel with a thickness of only 0.012 inch. Thus, by comparing the insulative effect of these two panels designated by reference points F and G, the substantial improvement in insulative effect produced by utilizing panel wall members of thinner materials can be readily visualized. In a similar vein, reference point H shows the insulative effect of a one-half inch thick panel having skins of 0.015 inch and one side of it encased within a one inch polyurethane foam block. Point J shows, as a result of a similar evaluation, the insulative effect of one inch panel having walls of 0.015 inch and one side of it encased within a one-half inch polyurethane foam block. Point K shows a one inch panel having walls of 0.012 inch steel and one side of it encased within a one-half inch polyurethane foam block. As can be seen, these panels exhibit excellent insulating qualities, resulting from the synergistic effect of the vacuum insulated panel according to the present invention and the encasement of one side of the vacuum insulated panel of the present invention within a relatively thin layer of polyurethane foam.

While the invention has been described in the preferred embodiments, it is understood that the words which have been used herein are words of description, rather than words of limitation. Changes may be made, within the purview of the appended claims, without departing from the scope and spirit of the invention in its broader aspects. Although the invention has been described herein in reference to particular means, materials and embodiments, it is understood that the invention is not to be limited to the particulars disclosed herein, and that the invention extends to all equivalent structures, methods and uses, e.g., within the scope of the appended claims.

We claim:

1. A vacuum insulated panel comprising first and second all-metal wall members joined together to define a cavity, a getter positioned within said cavity, said getter positioned in contact with said metal wall members, said getter comprising a compressed cake of powder material which substantially fills said cavity and prevents said wall members from contacting each other, means for assisting in evacuating said cavity to establish a vacuum within said cavity, and means for preventing said getter from being evacuated by said means for assisting in evacuating said cavity, said preventing means comprising a gas-permeable getter-impermeable member.

2. The vacuum insulated panel according to claim 1, further comprising means for sealing said cavity after a vacuum is established in said cavity.

3. The vacuum insulated panel according to claim 1, wherein said compressed cake comprises the sole means within said cavity for spacing main portions of said wall members from each other during and after evacuation of said cavity.

4. The vacuum insulated panel according to claim 1, wherein said getter comprises a compressed cake of at least one of activated carbon black and silica gel.

5. The vacuum insulated panel according to claim 1, wherein said means for assisting in evacuating said cavity is adapted to be attached to means for establishing a hard vacuum within said cavity.

6. The vacuum insulated panel according to claim 1, wherein said assisting means includes an evacuation port in one of said wall members, said preventing means comprising a gas permeable member impervious to said getter, said preventing means being positioned adjacent to said evacuation port.

7. The vacuum insulated panel according to claim 6, wherein said gas permeable member comprises a mesh layer and a fiberglass paper layer peripherally sealed about said evacuation port.

8. The vacuum insulated panel according to claim 1, further including an expanded foam material covering at least one of said joined wall members.

9. A vacuum insulated panel comprising first and second peripherally joined, all-metal panels defining a cavity, a compressed cake within said cavity, means for assisting in creating a vacuum within said cavity, wherein said compressed cake is in contact with said metal panels and comprises a getter material, said compressed cake substantially filling said cavity, said cake comprising means for preventing said metal panels from coming into contact with each other at least during the creation of the vacuum, and means for preventing said getter from being evacuated during creation of a vacuum within said cavity, said preventing means comprising a gas-permeable getter-impermeable member.

10. A vacuum insulated panel in accordance with claim 9, further comprising means for sealing said cavity after the vacuum is established in said cavity.

11. The vacuum insulated panel of claim 9, wherein said metal panels include joined peripheral portions and said metal panels contact each other only at said peripheral portions.

12. The vacuum insulated panel of claim 9, further including a foam insulating material covering at least one of said metal panels.

13. The vacuum insulated panel of claim 9, wherein said means for assisting in creating a vacuum is adapted to be attached to means for establishing a hard vacuum within said cavity.

14. A method of making a vacuum insulated panel, said method comprising the steps of:
  introducing a compressed block of powder getter material into a recess in a first all-metal member;
  forming a cavity containing said block by completely sealing a peripheral edge of said first member to a peripheral edge of a second structurally stable all-metal member;
  evacuating the cavity through an aperture in one of said members; and
  preventing the evacuation of the powder material through the aperture while the cavity is being evacuated by providing a gas-permeable getter-impermeable member within the cavity.

15. The method of making a vacuum insulated panel according to claim 14, further comprising sealing the aperture.

16. The method of making a vacuum insulated panel according to claim 14, wherein a compressed block of at least one of activated carbon black and silica gel is introduced into the cavity.

17. The method of making a vacuum insulated panel according to claim 14, wherein the powder material is prevented from being evacuated by positioning a gas porous member that is impervious to the powder material adjacent to the aperture.

18. The method of making a vacuum insulated panel according to claim 17, further comprising preventing said members from coming into contact with each other during evacuation of the cavity.

19. The method of making a vacuum insulated panel according to claim 14, further comprising the step of covering at least one side of the panel with an insulating material.

20. The method of making a vacuum insulated panel according to claim 14, wherein the cavity is evacuated by establishing a hard vacuum within the cavity.

21. A vacuum insulating panel made according to the method of claim 14.

22. A vacuum insulated article of manufacture comprising first and second all-metal panels defining an evacuated vacuum cavity, each of said panels having an edge, said edges being attached to each other, a block of compressed powder getter material and a gas-permeable getter-impermeable member for preventing evacuation of said getter material being positioned within said cavity, said powder material comprising means for preventing collapse of said cavity during evacuation, means for acting as a radiant barrier, and means for acting as a getter within said cavity.

23. The vacuum insulated article according to claim 22, wherein at least one of said joined, evacuated panels is covered with an insulating material.

24. The vacuum insulated article according to claim 22, wherein said powder material comprises at least one of activated carbon black and silica gel.

25. The vacuum insulated article according to claim 22, wherein the vacuum in said cavity is a hard vacuum.

26. A vacuum insulated panel comprising:

means for defining a cavity, said cavity defining means comprising a pair of generally planar, peripherally sealed, metallic panel members;

means for assisting in the creation of a hard vacuum within said cavity;

means, within said cavity, acting as a getter, and contacting said cavity defining panel members, said getter substantially filling said cavity and comprising a compressed cake of powder material; and means for preventing evacuation of said getter when said hard vacuum is established within said cavity, said preventing means being positioned adjacent said assisting means and comprising a gas-permeable getter-impermeable member.

27. The vacuum insulated panel according to claim 26, wherein said getter means comprises means for preventing said panel members from coming into contact with each other during and after establishment of said hard vacuum within said cavity.

28. The vacuum insulated panel according to claim 26, wherein at least one side of said panel is covered by a foam insulating material.

29. The vacuum insulated panel according to claim 26, wherein said means for preventing evacuation comprises a gas permeable member impervious to said getter means, said member being positioned adjacent a sealable evacuation port provided in said cavity defining means.

30. A vacuum insulated panel of claim 26, wherein said getter comprises at least one of activated carbon black and silica gel.

31. A method of forming a vacuum insulated panel comprising the steps of:

providing a peripherally sealable cavity;

positioning, within the cavity, a compressed powder getter material of sufficient density to prevent collapse of the cavity upon evacuation of the cavity to a hard vacuum;

providing an evacuation port for the cavity;

positioning a gas permeable, getter material impermeable, filter adjacent the evacuation port;

peripherally sealing the cavity;

evacuating the cavity, through the evacuation port, to a hard vacuum; and sealing the evacuation port to maintain the hard vacuum within the cavity, wherein said peripherally sealable cavity is defined by self-supporting all-metal members and wherein the step of peripherally sealing the cavity comprises peripherally sealing the cavity by metal to metal contact of said cavity defining members.

32. The method of forming a vacuum insulated panel according to claim 31, further comprising covering at least one side of the sealed evacuated cavity with a foam insulating material.

33. The method of forming a vacuum insulated panel according to claim 31, wherein the gas permeable, getter material impermeable filter is positioned adjacent the evacuation port by securing a mesh member and a fiberglass paper layer to the inside of the cavity.

34. A vacuum insulated panel formed according to the method defined by the steps of claim 31.

35. The method of forming a vacuum insulated panel according to claim 31, wherein the solid powder getter material comprises a compressed block of activated carbon black.

36. The method of forming a vacuum insulated panel according to claim 31, wherein the compressed powder getter material within the cavity substantially fills the cavity.

37. A vacuum insulated panel comprising first and second all-metal wall members peripherally joined directly to each other to define a cavity, each of said wall members comprising a stainless steel sheet having a thickness of about 0.004 to 0.013 inch a block of powder getter material positioned within said cavity and contacting said wall members, means for assisting in evacuating said cavity to establish a vacuum within said cavity, and means for preventing said getter from being evacuated by said means for assisting in evacuating said cavity, said means for preventing comprising a gas-permeable getter-impermeable member positioned adjacent said means for assisting.

* * * * *

UNITED STATES PATENT AND TRADEMARK OFFICE
CERTIFICATE OF CORRECTION

PATENT NO. : 5,252,408
DATED : October 12, 1993
INVENTOR(S) : J. BRIDGES et al.

It is certified that error appears in the above-indentified patent and that said Letters Patent is hereby corrected as shown below:

At column 2, line 54 change "10" to ---$10^{-3}$---.
At column 18, line 33 (claim 37, line 5) change "0.004 to 0.013 inch a" to ---0.004 - 0.013 inch, a---.

Signed and Sealed this

Tenth Day of October, 1995

Attest:

BRUCE LEHMAN

Attesting Officer

Commissioner of Patents and Trademarks